United States Patent
Byun et al.

(10) Patent No.: US 10,056,926 B2
(45) Date of Patent: Aug. 21, 2018

(54) METHOD AND DEVICE FOR TRANSMITTING AND RECEIVING INTER-CELL INFORMATION FOR CANCELLING INTER-CELL INTERFERENCE

(71) Applicant: LG ELECTRONICS INC., Seoul (KR)

(72) Inventors: Ilmu Byun, Seoul (KR); Heejeong Cho, Seoul (KR); Hyunsoo Ko, Seoul (KR); Hyeyoung Choi, Seoul (KR); Kungmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/528,151

(22) PCT Filed: Nov. 20, 2014

(86) PCT No.: PCT/KR2014/011168
§ 371 (c)(1),
(2) Date: May 19, 2017

(87) PCT Pub. No.: WO2016/080571
PCT Pub. Date: May 26, 2016

(65) Prior Publication Data
US 2017/0324433 A1    Nov. 9, 2017

(51) Int. Cl.
*H04B 1/00* (2006.01)
*H04B 15/00* (2006.01)
(Continued)

(52) U.S. Cl.
CPC ............. *H04B 1/10* (2013.01); *H04B 17/345* (2015.01); *H04B 7/0413* (2013.01)

(58) Field of Classification Search
CPC ..... H04B 7/0639–7/0643; H04B 7/024; H04B 7/0456–7/0486; H04B 7/0617; H04B 7/0417; H04B 7/0478; H04B 7/0634
(Continued)

(56) References Cited

U.S. PATENT DOCUMENTS 7,647,061 B1 * 1/2010 Steer ..................... H04W 24/00
                                                                                       455/446
8,571,128 B2 * 10/2013 Kim ..................... H04B 7/0417
                                                                                       375/267

(Continued)

FOREIGN PATENT DOCUMENTS

KR    10-2011-0103067 A    9/2011
KR    10-2013-0143005 A    12/2013

OTHER PUBLICATIONS

Samsung, "Inter-Cell Interference Mitigation Through Limited Coordination", R1-082886, 3GPP TSG RAN WG1 Meeting #54, Jeju, Republic of Korea, Aug. 18-22, 2008.

*Primary Examiner* — Edward Urban
*Assistant Examiner* — Rui Hu
(74) *Attorney, Agent, or Firm* — Birch, Stewart, Kolasch & Birch, LLP

(57) ABSTRACT

Provided are a method and a device for transmitting and receiving inter-cell information for cancelling inter-cell interference in a wireless communication system. The method for transmitting and receiving inter-cell information may comprise the steps of: taking a PMI set which is a set of PMIs of a signal generating interference to an area partitioned in a predetermined direction and transmitting same to the base station of an adjacent cell transmitting the signal generating interference; and receiving, from the base station of the adjacent cell, PMI information on at least one of the PMIs included in the PMI set.

10 Claims, 11 Drawing Sheets

(51) Int. Cl.
*H04B 1/10* (2006.01)
*H04B 17/345* (2015.01)
*H04B 7/0413* (2017.01)

(58) Field of Classification Search
USPC .......... 455/63.1–65, 296, 446–449, 69, 522
See application file for complete search history.

(56) References Cited

U.S. PATENT DOCUMENTS

| | | | | |
|---|---|---|---|---|
| 8,731,480 B2* | 5/2014 | Kim | ....................... | H04B 7/024 370/238 |
| 9,210,584 B2* | 12/2015 | Falconetti | ............ | H04B 17/382 |
| 9,282,469 B1* | 3/2016 | Park | ....................... | H04W 16/28 |
| 9,571,177 B2* | 2/2017 | Choi | ....................... | H04B 7/022 |
| 9,735,848 B2* | 8/2017 | Saiwai | .................. | H04W 72/10 |
| 2010/0232539 A1* | 9/2010 | Han | ....................... | H04B 7/024 375/285 |
| 2010/0284351 A1* | 11/2010 | Liang | .................. | H04B 7/0417 370/329 |
| 2010/0304690 A1* | 12/2010 | Proefke | .................. | B60R 25/24 455/69 |
| 2011/0034192 A1* | 2/2011 | Lim | ..................... | H04B 7/0417 455/501 |
| 2011/0092232 A1* | 4/2011 | Lee | ....................... | H04B 7/0639 455/501 |
| 2011/0105164 A1* | 5/2011 | Lim | ..................... | H04B 7/0417 455/501 |
| 2011/0218001 A1* | 9/2011 | Chien | .................... | H04B 15/00 455/501 |
| 2011/0223949 A1* | 9/2011 | Lee | ....................... | H04B 7/024 455/501 |
| 2011/0268068 A1 | 11/2011 | Jian et al. | | |
| 2012/0083282 A1* | 4/2012 | Choi | ..................... | H04B 7/022 455/449 |
| 2012/0207055 A1* | 8/2012 | Kang | ................... | H04B 7/0634 370/252 |
| 2012/0328035 A1* | 12/2012 | Yoon | .................... | H04B 7/0626 375/260 |
| 2013/0021925 A1* | 1/2013 | Yin | ....................... | H04B 7/024 370/252 |
| 2013/0021929 A1* | 1/2013 | Kim | ....................... | H04B 7/024 370/252 |
| 2013/0250885 A1* | 9/2013 | Davydov | ............... | H04B 7/024 370/329 |
| 2014/0003272 A1* | 1/2014 | Benjebbour | ........... | H04B 7/024 370/252 |
| 2014/0112403 A1* | 4/2014 | Falconetti | ............ | H04B 17/382 375/260 |
| 2014/0120937 A1* | 5/2014 | Lee | ....................... | H04B 7/024 455/452.2 |
| 2014/0140317 A1* | 5/2014 | Mobasher | .............. | H04B 7/024 370/330 |
| 2014/0153510 A1* | 6/2014 | Gomadam | ........... | H04B 7/024 370/329 |
| 2015/0016434 A1* | 1/2015 | Luo | .................... | H04W 72/082 370/336 |
| 2015/0036621 A1* | 2/2015 | Shin | ..................... | H04J 11/0036 370/329 |
| 2015/0063488 A1* | 3/2015 | Dinan | .................. | H04B 7/0456 375/267 |
| 2015/0188614 A1* | 7/2015 | Wang | .................... | H04B 7/024 370/329 |
| 2015/0311994 A1* | 10/2015 | Thiele | .................. | H04B 7/0417 370/329 |
| 2015/0333807 A1* | 11/2015 | Saiwai | ................. | H04B 7/0456 375/267 |

* cited by examiner

METHOD AND DEVICE FOR TRANSMITTING AND RECEIVING INTER-CELL INFORMATION FOR CANCELLING INTER-CELL INTERFERENCE

CROSS REFERENCE TO RELATED APPLICATIONS

This application is the National Phase of PCT International Application No. PCT/KR2014/011168, filed on Nov. 20, 2014, all of which are hereby expressly incorporated by reference into the present application.

BACKGROUND OF THE INVENTION

Field of the Invention

The present invention relates to a method and apparatus for transmitting an inter-cell information for removing inter-cell interference, and more particularly, to a method and apparatus for transmitting and receiving inter-cell information for removing inter-cell interference in a massive MIMO system.

Related Art

Recently, commercialization of the long term evolution (LTE) system, which is the next generation of wireless communication systems, has been supported earnestly. After the necessities were recognized that mass data service is to be supported in high-quality in response to users' request as well as voice service while ensuring users' mobility, the trend is that such an LTE system has been more rapidly expanded. The LTE system provides low transmission delay, high transmission rate, high system capacity and coverage improvement.

Owing to the advent of such a high-quality service, needs for wireless communication service have been abruptly increased. In order to actively cope with such a situation, more than anything else, the capacity of the communication system should be increased. The way for increasing the communication capacity in the wireless communication environment may include a method for newly finding available frequency band and a method for increasing efficiency for the limited resource.

As a method for increasing efficiency of the limited resource, a technique for increasing a transmission capacity, so-called the multiple antenna transmission and reception technique has been vigorously developed with a great attention, which takes a diversity gain by additionally securing the spatial area for the resource utilization by mounting multiple antennas on a transceiver or increases a transmission capacity by transmitting data in parallel through each antenna.

In the multiple antenna system, the beamforming and the precoding may be used for increasing the Signal to Noise Ratio (SNR). In the closed-loop system that may use feedback information in a transmission end, the beamforming and the precoding are used for maximizing the SNR through the corresponding feedback information.

SUMMARY OF THE INVENTION

An aspect of the present invention is to propose a method and apparatus for transmitting and receiving inter-cell information for performing an inter-cell interference removal in a massive MIMO communication system.

An embodiment of the present invention is to propose a method and apparatus for transmitting and receiving PMI information between a base station of a cell that undergoes interference and a base station of a cell that causes interference so as to perform an inter-cell interference removal in a massive MIMO system.

A method for transmitting and receiving inter-cell information may include transmitting a PMI set that is a set of PMIs of a signal that causes interference in an area divided into a predetermined direction to a base station of a neighboring cell that transmitting a signal that causes interference; and receiving PMI information for at least one of the PMIs included in the PMI set from the base station of the neighboring cell.

Advantageous Effects

According to an aspect of the present invention, it is proposed a method and apparatus for transmitting and receiving inter-cell information for performing an inter-cell interference removal in a massive MIMO communication system.

According to an aspect of the present invention, it is proposed a method and apparatus for transmitting and receiving PMI information between a base station of a cell that undergoes interference and a base station of a cell that causes interference so as to perform an inter-cell interference removal in a massive MIMO system.

According to an aspect of the present invention, an amount of the information transmitted and received for an inter-cell interference control may be decreased.

According to an aspect of the present invention, a time delay may be decreased, which occurs when transmitting and receiving the inter-cell interference information used for the inter-cell interference control.

According to an aspect of the present invention, the inter-cell interference information that reflects the environment in which interference occurs actually may be transmitted and received.

DESCRIPTION OF EXEMPLARY EMBODIMENTS

The present specification describes wireless communication network as an object, the tasks performed in the wireless communication network may be performed during the process of controlling the network in the system (for example, a base station) that controls the corresponding wireless communication network and transmitting data, or performed by the user equipment that is coupled to the corresponding wireless network.

Figure 1:
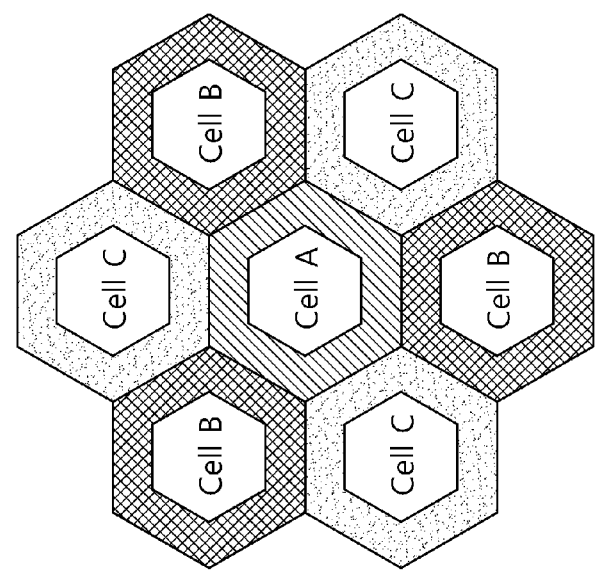
FIG. 1 is a diagram for describing the inter-cell interference coordination in the LTE system.
Figure 1:
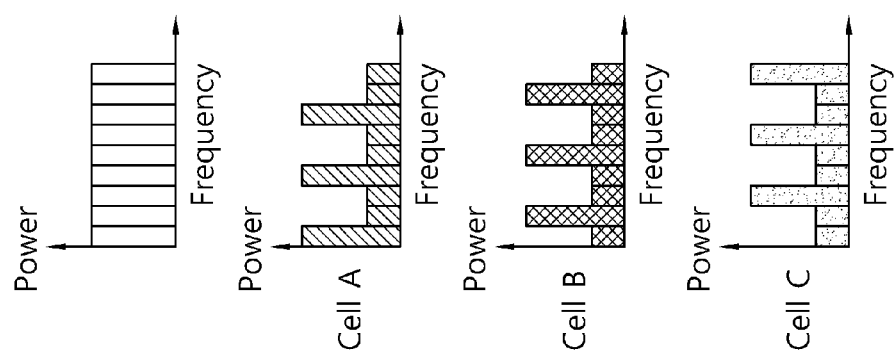

FIG. 1 is a diagram for describing the inter-cell interference coordination in the LTE system.

In the LTE system, each cell may be divided into interior and exterior. In the interior cell in which a user undergoes interference of low level and low power is required for the communication with a serving cell, the frequency reuse factor is 1.

In the case of the exterior cell, when the cell schedules a user to a part of given band, the system capacity may be optimized for the case that neighboring cells do not transmit anything or the case that neighboring cells transmit low power to the users existed inside of adjacent cells in order to avoid strong interference that may occur for the user scheduled in the first cell.

Such a limitation brings about the result of increasing the frequency reuse rate in a cell-edge, which is known as the partial frequency reuse as shown in FIG. 1.

As shown in FIG. 1, each of the cells A, B and C may be divided into interior area and exterior area, and the frequency resource for each cell-edge is allocated to a cell in order not to be overlapped in an adjacent cell. In the case that a specific frequency resource is allocated to the exterior area of cell A, the corresponding frequency resource is not allocated in cell B and cell C. And in the case that a specific frequency resource is allocated to the exterior area of cell B, the corresponding frequency resource is not allocated in cell A and cell C. In the same way, in the case that a specific frequency resource is allocated to the exterior area of cell C, the corresponding frequency resource is not allocated in cell A and cell B.

In order to coordinate the scheduling for other cells in such a way, a communication is required between neighboring cells. In the case that the neighboring cells are managed by the same base station (e.g., eNodeB), the coordinated scheduling plan may be performed without request for a standardized signaling. However, in the case that the neighboring cells are managed by different base stations, particularly, in the multivendor networks, the standardized signaling is important.

In LTE, it is assumed that the Inter-Cell Interference Coordination (ICIC) is managed in the frequency domain, rather than in the time domain, and the signaling between base stations is designed for supporting it. This is because the time domain coordination may interfere with the operation for the HARQ process like the uplink in which the synchronous Hybrid Automatic Repeat reQuest (HARQ) is used.

Regarding a downlink transmission, the bitmap expressed by a Relative Narrowband Transmit Power (RNTP) may be exchanged through an X2 interface. Each bit of an RNTP indicator that corresponds to a single resource block in the frequency domain is used for notifying whether to maintain the transmission power for the resource block below a specific upper limit to neighboring base stations. Such an upper limit and the term of validity may be preconfigured.

For example, when the RNTP indicator is 1, which represents a state that the transmission power is maintained to a specific resource block, that is, a signal transmission, and when the RNTP indicator is 0, which represents a state that a signal is not transmitted to the corresponding resource block, that is, a state that beamforming is not performed.

Accordingly, the degree of interference anticipated in each resource block may be considered when neighboring cells schedule a user in their own cells.

In the case that a base station receives the information that the transmission power of the resource block in a neighboring cell is high, the follow-up operation is not consistent. Accordingly, a certain degree of freedom is allowed for performing the scheduling algorithm. However, a typical operation may have a user in a cell-edge avoid scheduling for the resource block of which transmission power is high.

In the definition of an RNTP indicator, the transmission power per antenna port may be normalized by the maximum output power of a base station or a cell. This is because the cell that has small maximum output power owing to its small size may undergo greater interference than the cell that has great maximum output power that corresponds to the cell of which size is great.

The determination for the RNTP indicator may be performed by Equation 1.

$$RNTP(n_{PRB}) = \begin{cases} 0 & \text{if } \frac{E_A(n_{PRB})}{E^{(p)}_{max\_nom}} \leq RNTP_{threshold} \\ 1 & \text{if no promise about the upper limit of } \frac{E_A(n_{PRB})}{E^{(p)}_{max\_nom}} \text{ is made} \end{cases} \quad [\text{Equation 1}]$$

In Equation 1, $E_A(n_{PRB})$ represents the maximum intended energy per resource element (EPRE) of a UE-specific physical downlink shared channel (PDSCH) REs for an orthogonal frequency division multiplexing (OFDM) symbol that does not include a reference signal (RS) in the physical resource block for antenna port p during the next specific time duration, and $n_{PRB}$ represents the number of physical resource blocks. $n_{PRB}$ may have a value from 0 to $N_{RB}^{DL}-1$. $RNTP_{threshold}$ may have a value belonged to $\{-\infty, -11, -10, -9, -8, -7, -6, -5, -4, -3, -2, -1, 0, +1, +2, +3\}[\text{dB}]$ ($RNTP_{threshold} \in \{-\infty, -11, -10, -9, -8, -7, -6, -5, -4, -3, -2, -1, 0, +1, +2, +3\}[\text{dB}]$).

In addition, in Equation 1, $E^{(p)}_{max\_nom}$ may be expressed as Equation 2.

$$E^{(p)}_{max\_nom} = \frac{P^{(p)}_{max} \cdot \frac{1}{\Delta f}}{N_{RB}^{DL} \cdot N_{SC}^{RB}} \quad [\text{Equation 2}]$$

In Equation 2, $\Delta f$ represents a subcarrier spacing, and $N_{RB}^{DL}$ represents a Downlink bandwidth configuration. And $N_{SC}^{RD}$ represents a resource block size in the frequency domain, expressed as the number of subcarriers.

According to Equation 1, the RNTP indicator becomes 0 when the energy $$\frac{E_A(n_{PRB})}{\left(E_{max\_nom}^{(p)}\right)}$$

of a normalized RE is equal or smaller than RNTP$_{threshold}$ which is preconfigured, and becomes 1 in the case that there is no rule in the upper limit of the energy $$\frac{E_A(n_{PRB})}{\left(E_{max\_nom}^{(p)}\right)}$$

of a normalized RE. That is, the RNTP indicator may become 1 when $$\frac{E_A(n_{PRB})}{\left(E_{max\_nom}^{(p)}\right)}$$

is greater than RNTP$_{threshold}$.

Meanwhile, a transmission antenna generates an electromagnetic wave which is strong in a specific direction in comparison with other directions. The representation of field strength for a direction is referred to as a radiation pattern. The radiation pattern has always the same shape in a transmission and a reception.

The electromagnetic wave measured on a point far away from the antenna corresponds to the summation of the radiation rays radiated from all parts of the antenna. Each of the small parts of the antenna radiates waves that have different widths and phases, and such radiation wave moves different distances from the point where a receiver is located. the gain of such a radiation wave may be increased in some direction and may be decreased in some other direction.

Figure 2:
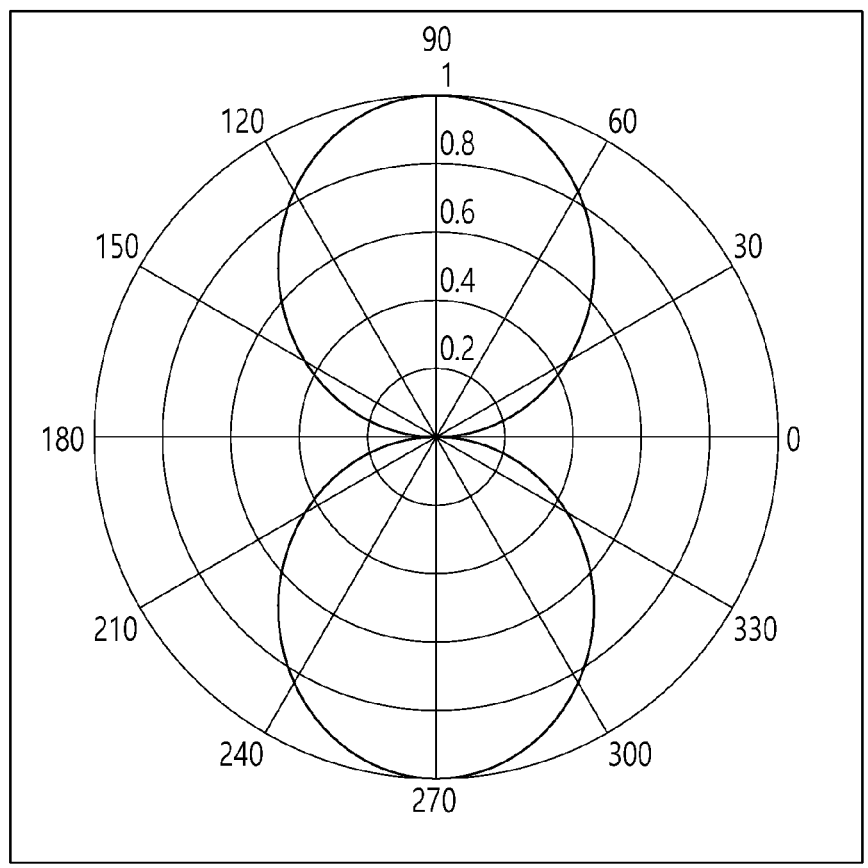
FIG. 2 illustrates a radiation pattern of the half-wave dipole antenna.
Figure 2:
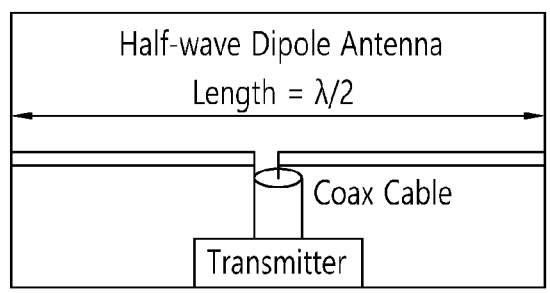

A half-wave dipole antenna is a simple half-way antenna in which a wire is connected to a disconnected central portion for cable connection. FIG. 2 illustrates a radiation pattern of the half-wave dipole antenna.

A directional antenna is designed to have gain in only one direction and to have loss in other directions. As an antenna increases in size, directivity thereof is created. A wave radiated from an antenna travels a long distance with directivity and may be more easily controlled when given a directional radiation pattern which is constructive interference or unconstructive interference.

Figure 3:
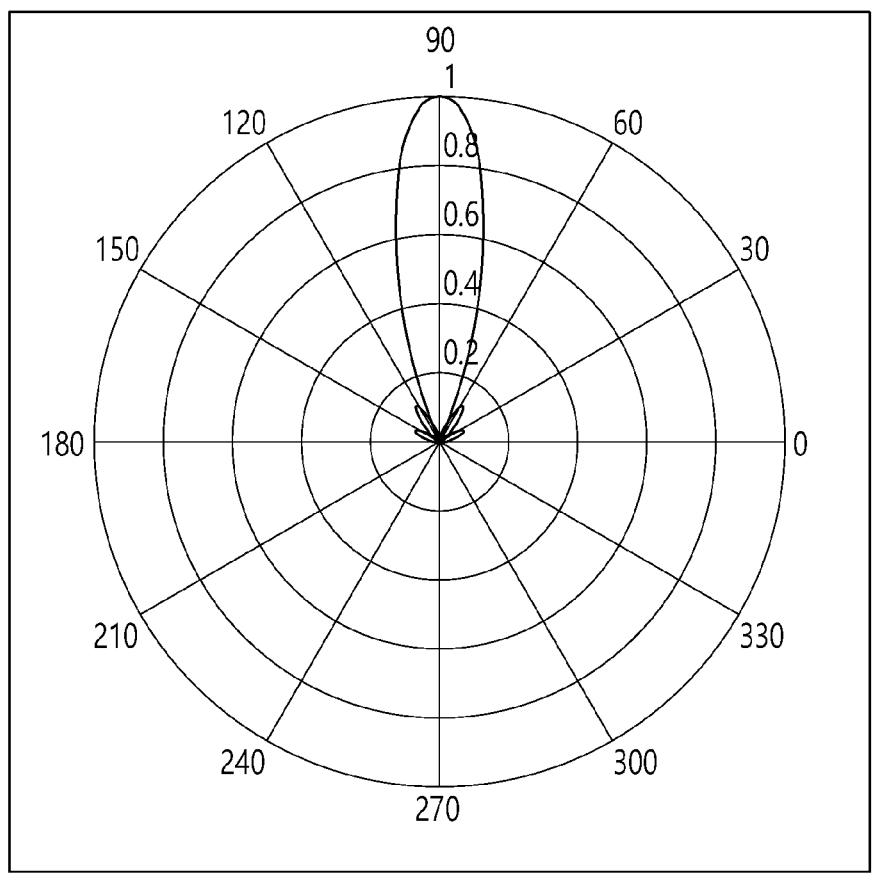
FIG. 3 illustrates a radiation pattern of a circular aperture antenna, such as a satellite receiving antenna.
Figure 3:
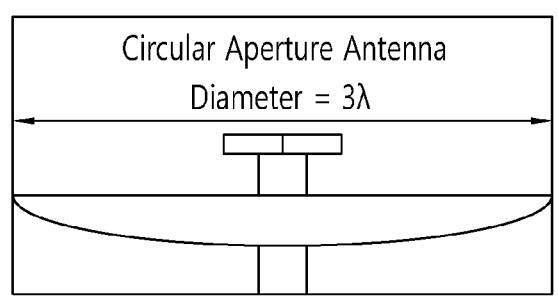

To be extremely simplified, a satellite receiving antenna is considered to be a circular surface from which the same electromagnetic waves are radiated in all parts. FIG. 3 illustrates a radiation pattern of a circular aperture antenna, such as a satellite receiving antenna.

Referring to FIG. 3, a beam with a narrow width having a high gain is disposed at the center of the radiation pattern. As the diameter of the antenna increases according to a wavelength, the width of the central beam becomes gradually narrow. Small beams called side lobes appear on both sides of the central beam. The direction of a signal with the signal strength of 0 may be expressed as "nulls."

A simple directional antenna is constructed from a linear array of small radiating antenna elements, and the same signal with the same amplitude and the same phase is provided from one transmitting end to each antenna element. As the entire width of the array increases, the central beam becomes narrow; as the number of antenna elements increases, side robes become small.

Figure 4:
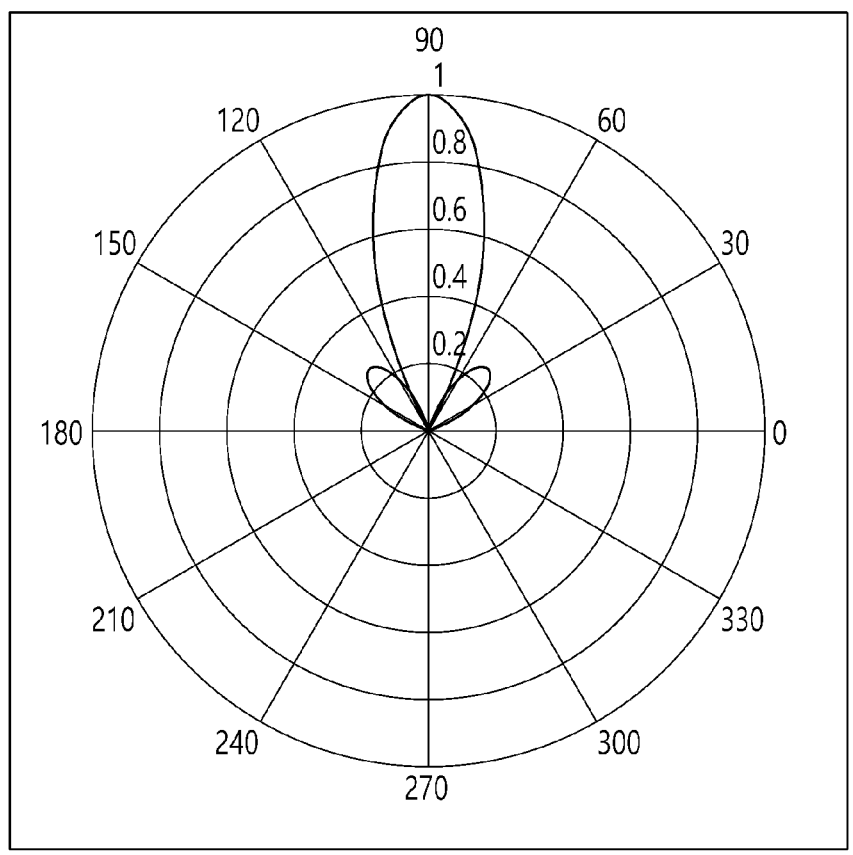
FIG. 4 illustrates a radiation pattern of a linear array antenna.
Figure 4:
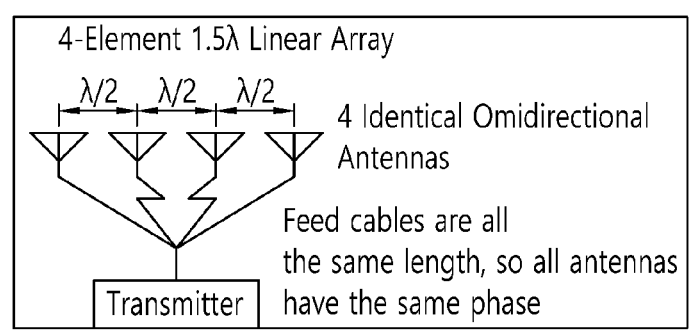

FIG. 4 illustrates a radiation pattern of a linear array antenna. FIG. 4 shows a radiation pattern of four small antenna elements disposed at an interval of 1λ/2.

Meanwhile, the radiation pattern of the linear array may be represented as a radiation pattern of a single antenna multiplied by an array factor (AF) representing impact of constructive interference and destructive interference of each antenna signal. That is, the array factor represents a change in maximum antenna gain according to a beam width.

Figure 5:
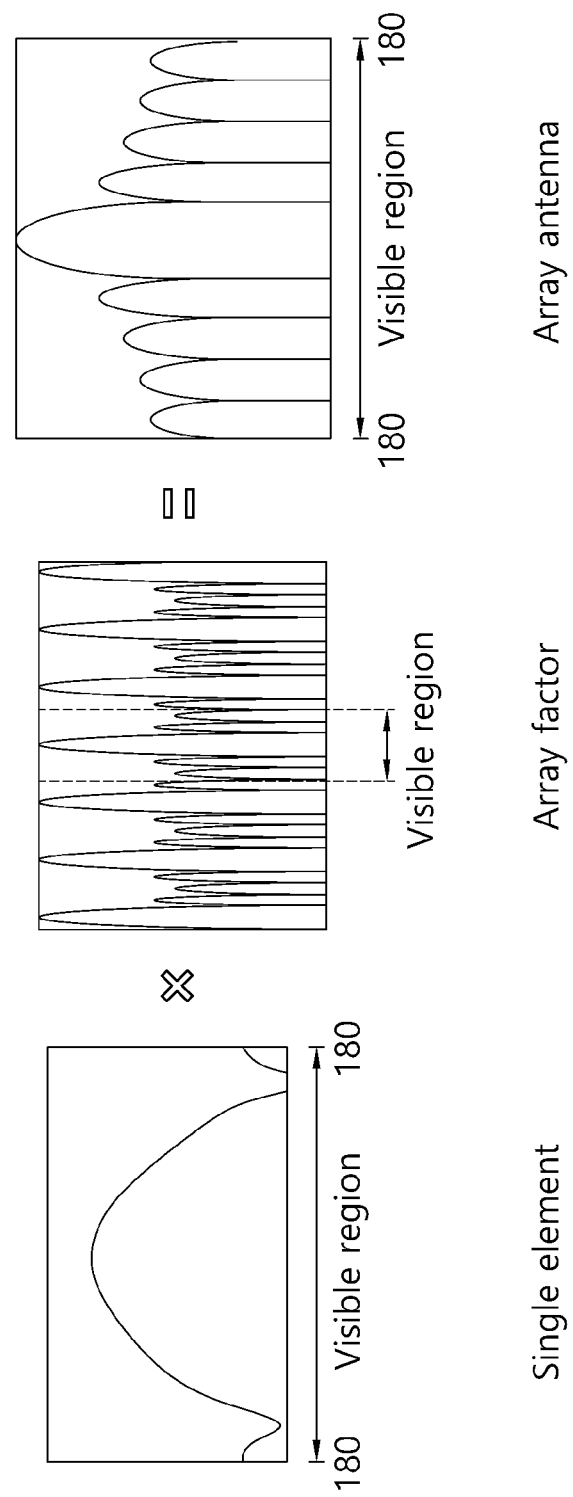
FIG. 5 illustrates a process of obtaining a radiation pattern of a linear array antenna.

FIG. 5 illustrates a process of obtaining a radiation pattern of a linear array antenna. As shown in FIG. 5, an antenna gain may be obtained by multiplying a radiation pattern of a single antenna (single element) by an array factor.

An array factor may be changed based on the number of antennas forming an antenna array, the distance between antennas, and a weight by which each antenna is multiplied. The array factor may be represented as Equation 3.

$$AF(\theta) = \sum_{n=1}^{N_T} w_n e^{j(n-1)(kd\cos\theta + \phi)} \quad \text{[Equation 3]}$$

In Equation 3, $N_T$ denotes the number of antennas, $w_n$ denotes a weight for each antenna, d denotes the distance between antennas, $k=2\pi/\lambda$ denotes a wave number, θ denotes an angle from a directing point of an antenna array, and φ denotes a phase offset.

That is, when the heading direction (θ) of a beam from an antenna array is 0 and antennas are disposed at equal intervals, array factor values are expressed to be laterally symmetrical based on the heading direction.

In the case that a base station transmits a signal in a direction rotated through x degrees based on a boresight to which the antenna heads, an antenna gain at a directing point of a beam may be represented as $E_r(x)AF(0)$. Further, a beam gain at a point rotated through y degrees based on the directing point of the beam may be represented as $E_r(x+y)AF(y)$ As shown in FIG. 5, a window (vision region) of an AF may be shifted according to θ applied to the AF, and a final antenna gain is obtained by multiplying the window and a corresponding antenna radiation pattern.

Figure 6:
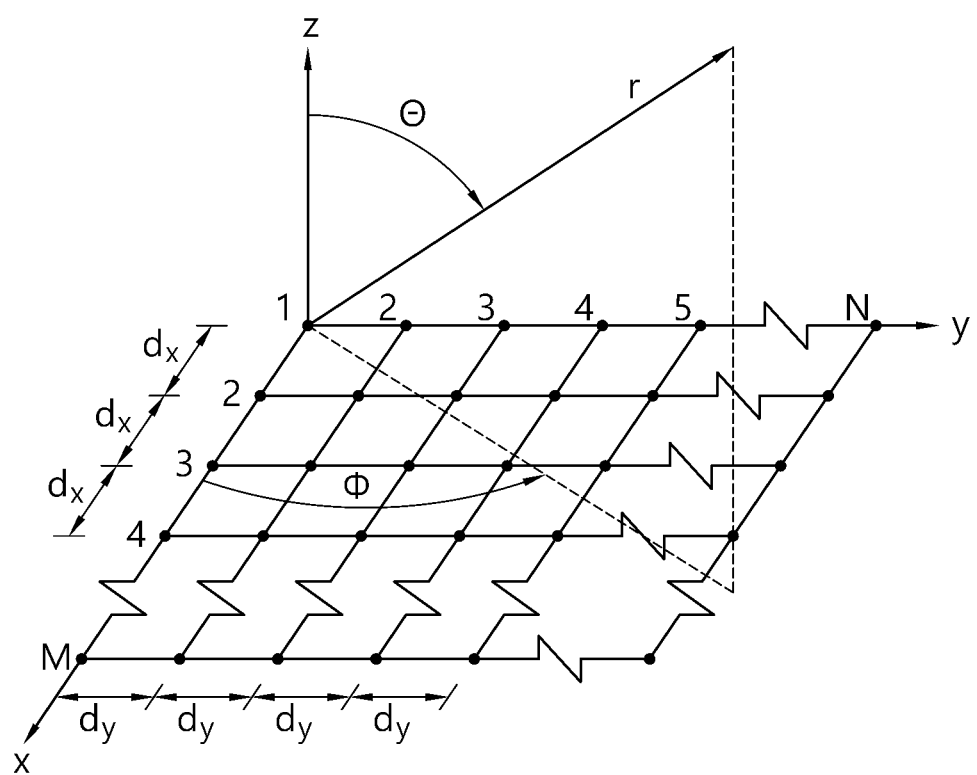
FIG. 6 is a diagram illustrating an array of antennas arranged in two-dimension.

FIG. 6 is a diagram illustrating an array of antennas arranged in two-dimension.

As shown in FIG. 6, antennas may be arranged in a predetermined interval in a horizontal direction and a vertical direction. Herein, θ represents an azimuth angle and φ represents a vertical angle. Herein, dx and dy represent intervals between antenna devices in horizontal and vertical directions, respectively.

In the case that antennas are arranged as shown in FIG. 6, $$AF(\theta,\phi) = AF_H(\theta,\phi)AF_V(\theta,\phi) \quad \text{[Equation 4]}$$

In Equation 4, $AF_H$ and $AF_V$ may be represented as Equation 5 and Equation 6, respectively.

$$AF_H(\theta, \phi) = \sum_{n=1}^{N} w_{1n} e^{j(n-1)(kd_y \sin\theta\sin\phi + \beta_y)} \quad \text{[Equation 5]}$$

$$AF_V(\theta, \phi) = \sum_{m=1}^{M} w_{m1} e^{j(m-1)(kd_x \sin\theta\cos\phi + \beta_x)} \quad \text{[Equation 6]}$$

Similarly, the radiation pattern of a single antenna may be represented by $E_r(\theta,\varphi)$ as a variable of $\theta$ and $\varphi$.

Meanwhile, in a system like a Coordinated Multipoint (CoMP), interference may be exchanged between base stations. And, based on the information, a user equipment may perform scheduling.

Figure 7:
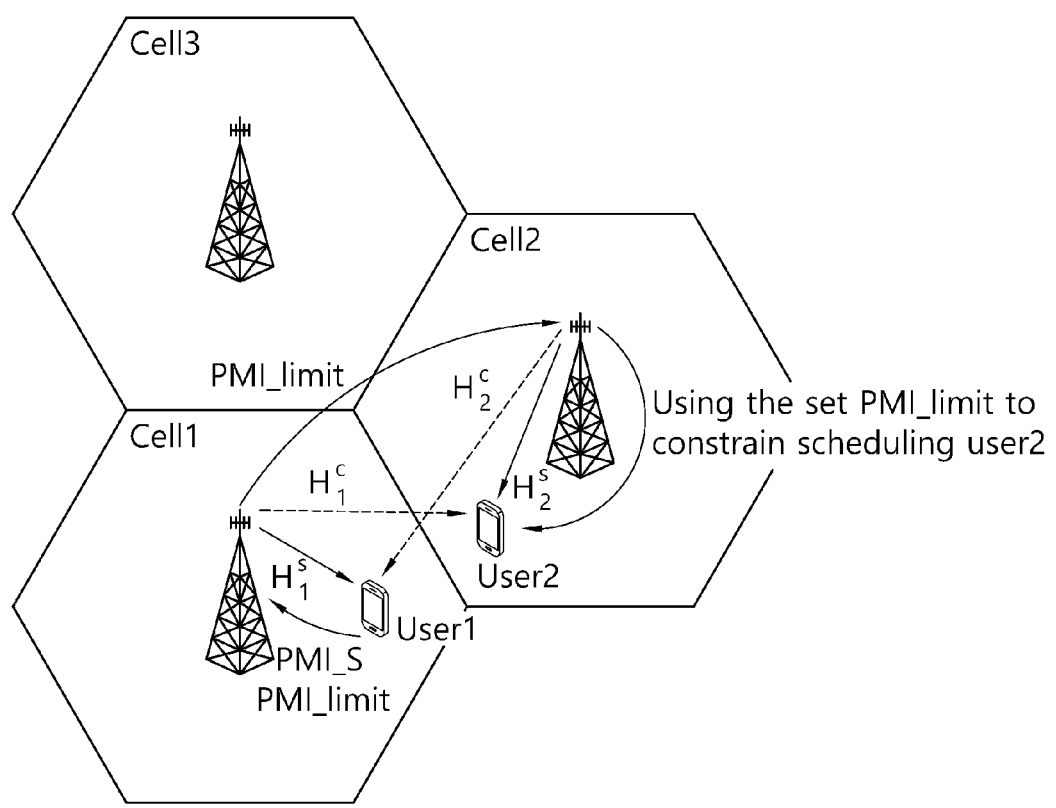
FIG. 7 is a diagram for describing a method for exchanging inter-cell information according to the conventional communication system.

FIG. 7 is a diagram for describing a method for exchanging inter-cell information according to the conventional communication system. FIG. 7 describes a method for generating a user-specific interference control signal like a coordinated beamforming.

As shown in FIG. 7, it is assumed that there are three neighboring cells and a user equipment of cell 1 may undergo interference by the signal generated in cell 2. In this case, cell 2 that generates an interference signal may be referred to as an aggressor cell, and cell 1 that undergoes the interference may be referred to as a victim cell.

User equipment 1 (user 1) may transmit the feedback information for its own channel to a base station of cell 1. Such feedback information may include the feedback information (precoding matrix indicator (PMI)_S) for the signal received by itself and the feedback information (PMI_limit) for the interference signal by cell 2.

When the feedback information (PMI_limit) for the interference signal is used by a base station of the aggressor cell using a Channel Status Information-Reference Signal (CSI-RS) of the aggressor cell that causes the interference, the feedback information (PMI_limit) for the interference signal may be the PMI information for the signal that causes a lot of interference to the user equipment itself.

A base station in the victim cell that receives PMI_limit may transfer the feedback information to the base station of the aggressor cell, and the base station of cell 2 may utilize the PMI_limit for scheduling user equipment 2 (user 2). For example, the base station of cell 2 may limit the PMI specified by PMI_limit to be scheduled to user equipment 2.

Meanwhile, since the method for exchanging inter-cell information is able to operate only in the case that the user equipment receives a CSI-RS of the victim cell as shown in FIG. 7, it may not be applied to the case that the coverage mismatch occurs between the area for stably receiving the CSI-RS and a beamforming signal. When the massive MIMO is introduced, the beam generated in the aggressor cell may penetrate deep into an inside of the victim cell owing to the increase of beam gain. In this case, since the coverage mismatch may occur between the CSI-RS that does not perform the beamforming and the signal undergoes the beamforming, an interference control method that may be applied even in this case is required.

In addition, an introduction of two-dimensional massive MIMO gives rise to the increase of the number of PMIs for performing the beamforming. In the conventional one-dimensional antenna array system, the PMI is utilized for representing a horizontal directing point of a beam. However, according to the introduction of the two-dimensional massive MIMO, the PMI that represents a vertical directing point of a beam is required. In addition, in the massive MIMO, the PMI for representing different beam widths is additionally required. That is, when the two-dimensional massive MIMO is introduced, the PMI should represent all of the horizontal and vertical direction of a beam and a beam width.

Meanwhile, there is a problem that the PMI used for the interference control and the PMIs used when transmitting a downlink transmission signal are not distinguished, and the increase of the number of PMIs used for the interference control means the increase of the amount of inter-cell interference exchange in a system that requires the coordinated beamforming as shown in FIG. 7.

Particularly, in the case that a backhaul amount is restricted, it is required to decrease the amount of inter-cell interference exchange in order to efficiently perform the inter-cell interference control.

Accordingly, according to an aspect of the present invention, it is proposed a method for a base station of a victim cell to indicate an interference_PMI_set that is going to be used when exchanging the interference control information to a base station of an aggressor cell, and for the base station of the aggressor cell to generate an inter-cell interference control signal using the interference_PMI_set.

The interference_PMI_set according to an aspect of the present invention has the following characteristics.

(1) The iPMIs that are elements of the interference_PMI_set may be directed to different directions in a vertical direction and a horizontal direction, respectively.

(2) The iPMIs that are elements of the interference_PMI_set may have the same antenna gain. That is, the change of beam width and the antenna gain may not be represented through the iPMIs.

(3) The interference_PMI_set may be generated the base station of the victim cell, and may be transmitted to the base station of the aggressor cell. In the case that there are a plurality of interference_PMI_sets and the information of a plurality of interference PMI sets are shared with the base station of the victim cell and the base station of the aggressor cell, the base station of the victim cell may notify the index information that indicates one of a plurality of interference_PMI_sets to the base station of the aggressor cell.

(4) The number of iPMIs belonged to the interference_PMI_set and the direction of the iPMIs may be determined by the base station of the victim cell. This may mean that the victim cell is a subject of determining a range or an amount of performing interference removal.

(5) The interference_PMI_set may be regenerated when a communication environment is changed owing to a new built base station, construction of a building, an increase of the number of user equipments, and so on. As described above, the base station of the victim cell may have several types of interference_PMI_sets. The period for regenerating each of the interference_PMI_sets may be very long, and may also be a few second or more.

(6) In the case that its own level of interference control is changed depending on time, the base station of the victim cell may notify the interference_PMI_sets that are different depending on time to the base station of the aggressor cell. The period of changing the interference_PMI_set may be longer than the period of generating an interference_PMI_set.

(7) The base station of the aggressor cell may notify that it is transmitting a signal to an area of the corresponding iPMI by transmitting a specific iPMI of the interference_PMI_set to the base station of the victim cell.

Figure 8:
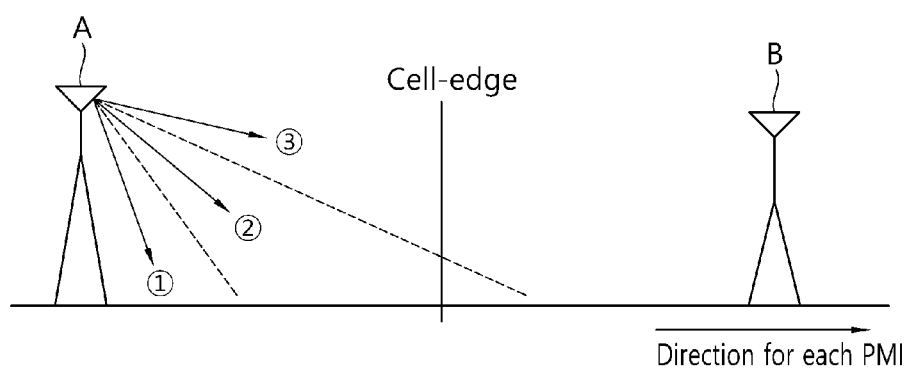
FIG. 8 is a diagram illustrating that a PMI is distinguished in a vertical direction according to an aspect of the present invention.
Figure 9:
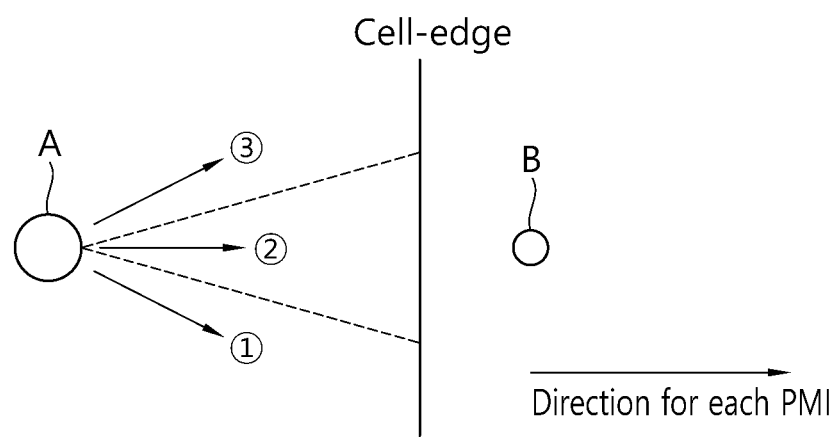
FIG. 9 is a diagram illustrating that a PMI is distinguished in a horizontal direction according to an aspect of the present invention.

FIG. 8 is a diagram illustrating that a PMI is distinguished in a vertical direction according to an aspect of the present invention, and FIG. 9 is a diagram illustrating that a PMI is distinguished in a horizontal direction according to an aspect of the present invention.

Base station A of an aggressor cell is located in the left side of FIG. 8 and FIG. 9, and base station B of a victim cell is located in the right side of FIG. 8 and FIG. 9. In FIG. 8, a beam is divided into the vertical direction that the beams are directing, and in FIG. 9, a beam is divided into the horizontal direction that the beams are directing.

In the case that the beam is divided into three areas in the vertical direction as shown in FIG. 8, the iPMI may become three, and in the case that the beam is divided into three areas in the horizontal direction as shown in FIG. 9, the iPMI may also become three. Accordingly, in the case that an area of beam is divided as shown in FIG. 8 and FIG. 9, base station A may transmit the interference_PMI_set including total 9 iPMIs to base station B.

Otherwise, in the case that area ① is excluded in the vertical direction, there exist two areas in the vertical direction and three areas in the horizontal direction, that is, total six iPMIs.

In the case that base station A in the aggressor cell is scheduled to transmit a signal through area ③ in the vertical direction and area ② in the horizontal direction to the wireless device belonged to the base station A itself, base station A may transmit the iPMI indicating the corresponding area to base station B in the victim cell.

The advantages of using an interference_PMI_set according to an aspect of the present invention as the inter-cell information are as follows.

First, the amount of information that is going to be transmitted when controlling the inter-cell interference may be decreased.

A base station of an aggressor cell transmits one of iPMIs belonged to an interference_PMI_set to a base station of a victim cell, not the PMI transmitted when the base station of the aggressor cell sends a signal to a specific wireless device.

For example, assuming that the number of PMIs that the base station of the aggressor cell normally uses is 64 and the number of iPMIs of the interference_PMI_set is 6, 6 bits are required for the base station of the aggressor cell to transmit the PMI used by it to the base station of the victim cell as it is. However, in the case of utilizing the interference_PMI_set, it is available to express the PMI using 3 bits only.

Second, in comparison with the conventional interference control technique, the time required for sending an interference control signal is reduced. In the conventional technique, a wireless device in a victim cell measures the interference and forwards it to a base station in the victim cell belonged to the wireless device itself. And, the base station of the victim cell forwards again the corresponding signal to a base station of an aggressor cell.

However, in the proposed method, the base station of the aggressor cell transmits the PMI including the information of the interference signal to the base station of the victim cell, and accordingly, the steps of forwarding a signal may be decreased.

Third, even in the case that it is unable to anticipate interference due to the coverage mismatch between the CSI-RS of an interference signal and a beamforming signal owing to the introduction of the massive MIMO system, the interference may be anticipated utilizing the interference_PMI_set for a beam.

Fourth, using the interference_PMI_set, in the case that interference does not occur in a neighboring cell due to the shadowing, the problem of excessive interference estimation may be solved since the iPMI in the corresponding direction is not included in the interference_PMI_set.

For example, during the procedure of the beam generated in an aggressor cell being transmitted, the beam generated in an aggressor cell may not exert as an interference signal since the beam is blocked by a physical object such as a high building or a mountain. In this case, the iPMI for the area existed in the building or the mountain may not be included in the interference_PMI_set.

In addition, in an actual channel environment, even in the case that the base station of the aggressor cell sends a strong signal through beamforming, the size of the signal may be decreased in a receiver due to the shadowing, and the like. In the case that the base station of the aggressor cell anticipates interference using only the size of the signal transmitted by the base station itself, excessive interference estimation may occur since the influence due to the shadowing is not considered.

However, by using the interference_PMI_set, in the case that the size of the signal is decreased due to the shadowing, and the like, the excessive interference estimation may be prevented by removing the iPMI for the corresponding signal in the interference_PMI_set in advance.

As such, when the interference_PMI_set is provided from a victim cell to an aggressor cell, the base station of the aggressor cell may forward the PMI information of the beam transmitted to the base station of the victim cell. The inter-cell interference information transmitted from the aggressor cell to the victim cell may be determined by Equations below.

The PMI used when the base station of the aggressor cell transmits a signal to user equipment is referred to as PMIi, and the interference_PMI_set received from the base station of the victim cell is referred to as interference_PMI) set={iPMI$_1$, iPMI$_2$, . . . , iPMI$_L$}.

In addition, V$_{angle}$(PMIi) may represent a vertical direction angle of PMIi, H$_{angle}$(PMIi) may represent a horizontal direction angle of PMIi, and AG(PMIi) may represent an antenna gain in the case of using PMIi. In this case, the base station of the aggressor cell may generate PMI_report(k) that is a user-specific interference control signal according to the condition of Equation 7.

[Equation 7]

$$PMI\_report(k) = iPMI_j, \text{ if}$$

$$V_{angle}(iPMI_j) - \frac{\Delta_v}{2} \le V_{angle}(PMI_i) < V_{angle}(iPMI_j) + \frac{\Delta_v}{2},$$

$$H_{angle}(iPMI_j) - \frac{\Delta_h}{2} \le H_{angle}(PMI_i) < H_{angle}(iPMI_j) + \frac{\Delta_h}{2},$$

$$AG(PMI_i) \ge AG_{threshold}$$

In Equation 7, $\Delta_v$ and $\Delta_h$ represent the quantization level of the PMI according to a vertical direction and a horizontal direction, respectively. AG$_{threshold}$ represents a value for detecting whether the interference influences on a neighboring cell is existed in the case that PMIi is belonged to iPMIj.

That is, in the case that the PMI of the beam generated in the aggressor cell is belonged to the quantization level of iPMIj belonged to the interference_PMI_set and the antenna gain AG(PMIi) of the beam is greater than a specific threshold antenna gain AG$_{threshold}$, the aggressor cell may report iPMIj to the victim cell.

When the number of PMIi that satisfies Equation 7 is K, the base station of the aggressor cell may transmit PMI_report(1), PMI_report(2), . . . , PMI_report(k) to the base station of the victim cell.

In the case that a single user equipment receives a signal using two or more PMIs, the aggressor cell may generate PMI_report(k) for each PMI.

In addition, in the case that a base station transmits a signal using two or more PMIs for the same resource, the aggressor cell may generate PMI_report(k) for each PMI.

According to another embodiment of the present invention, a PMI may be quantized with different intervals according to iPMIj that are not in the same interval in a vertical direction and a horizontal direction. In addition, $AG_{threshold}$ may also be differently configured according to iPMIj. When $\Delta_v(j)$ and $\Delta_h(j)$ are the regions of iPMIj, and $AG_{threshold}(j)$ a threshold value of iPMIj, Equation 7 may be modified to Equation 8.

[Equation 8]

$$\text{PMI\_report}(k) = iPMI_j, \text{ if}$$

$$V_{angle}(iPMI_j) - \frac{\Delta_v(j)}{2} \le V_{angle}(PMI_i) < V_{angle}(iPMI_j) + \frac{\Delta_v(j)}{2},$$

$$H_{angle}(iPMI_j) - \frac{\Delta_h(j)}{2} \le H_{angle}(PMI_i) < H_{angle}(iPMI_j) + \frac{\Delta_h(j)}{2},$$

$$AG(PMI_i) \ge AG_{threshold}(j)$$

In Equation 8, $AG_{threshold}(j)$ may be set to a different value corresponding to iPMIj, and in this case, PMI_report(k) may be represented as Equation 9.

[Equation 9]

$$\text{PMI\_report}(k) = iPMI_j, \text{ if}$$

$$V_{angle}(iPMI_j) - \frac{\Delta_v(j)}{2} \le V_{angle}(PMI_i) < V_{angle}(iPMI_j) + \frac{\Delta_v(j)}{2},$$

$$H_{angle}(iPMI_j) - \frac{\Delta_h(j)}{2} \le H_{angle}(PMI_i) < H_{angle}(iPMI_j) + \frac{\Delta_h(j)}{2},$$

$$AG(PMI_i) \ge AG_{threshold}(i)$$

In Equation 9, $AG_{threshold}(i)$ is a threshold value that is detected as interference in a neighboring cell for each iPMIj.

In Equation 7 to Equation 9 above, it is determined whether to generate PMI_report(k) depending on the size of the antenna gain in the case that PMIi is belonged to the region of iPMIj. However, in addition to the antenna gain, according to another aspect of the present invention, a product of the transmission power used for transmitting the corresponding PMI and the antenna gain or a product of a transmission energy and the antenna gain may be used for generating PMI_report(k).

Equation 10 below is a mathematical expression for determining whether to generate PMI_report(k) using the product of transmission power P used when transmitting a PMI and the antenna gain, and Equation 11 is a mathematical expression for determining whether to generate PMI_report(k) using the product of transmission energy used when transmitting a PMI and the antenna gain.

[Equation 10]

$$\text{PMI\_report}(k) = iPMI_j, \text{ if}$$

$$V_{angle}(iPMI_j) - \frac{\Delta_v(j)}{2} \le V_{angle}(PMI_i) < V_{angle}(iPMI_j) + \frac{\Delta_v(j)}{2},$$

$$H_{angle}(iPMI_j) - \frac{\Delta_h(j)}{2} \le H_{angle}(PMI_i) < H_{angle}(iPMI_j) + \frac{\Delta_h(j)}{2},$$

$$P \times AG(PMI_i) \ge PAG_{threshold}(j)$$

In Equation 10, $PAG_{threshold}(i)$ represents a threshold value of the power detected as interference by a user equipment of the victim cell multiplied by the antenna gain.

[Equation 11]

$$\text{PMI\_report}(k) = iPMI_j, \text{ if}$$

$$V_{angle}(iPMI_j) - \frac{\Delta_v(j)}{2} \le V_{angle}(PMI_i) < V_{angle}(iPMI_j) + \frac{\Delta_v(j)}{2},$$

$$H_{angle}(iPMI_j) - \frac{\Delta_h(j)}{2} \le H_{angle}(PMI_i) < H_{angle}(iPMI_j) + \frac{\Delta_h(j)}{2},$$

$$P \times N \times AG(PMI_i) \ge EAG_{threshold}(j)$$

In Equation 11, N represents the number of REs that use the corresponding PMIi, and $EAG_{threshold}(j)$ represents a threshold value of the transmission energy detected as interference by a user equipment of the victim cell multiplied by the antenna gain.

Meanwhile, according to another embodiment of the present invention, $PAG_{threshold}(i)$ of Equation 10 and $EAG_{threshold}(j)$ of Equation 11 may be defined for each individual PMIi as represented in Equation 8.

According to Equation 7 to Equation 11, when there is a plurality of PMIis for transmitting a signal to iPMIj region, iPMIj is transmitted several times. According to another embodiment of the present invention, the inter-cell interference control information may be generated by adding up all PMIis for transmitting a signal to iPMIj region. When a set of PMIs for transmitting to iPMIj region among the PMIs used for the base station of the aggressor cell to use for a transmission signal is referred to PMI_subset(j), PMI_subset (j) may be represented as Equation 12.

[Equation 12]

$$\text{PMI\_subset}(j) = \left\{ PMI_i \left| \begin{array}{c} V_{angle}(iPMI_j) - \frac{\Delta_v}{2} \le \\ V_{angle}(PMI_i) < V_{angle}(iPMI_j) + \frac{\Delta_v}{2}, \\ H_{angle}(iPMI_j) - \frac{\Delta_h}{2} \le \\ H_{angle}(PMI_i) < H_{angle}(iPMI_j) + \frac{\Delta_h}{2} \end{array} \right. \right\}$$

In this case, PMI_report(k) may be represented as Equation 13.

[Equation 13]

$$\text{PMI\_report}(k) =$$

$$iPMI_j \text{ if } \sum_{i \in PMI\_subset(j)} I(AG(PMI_i) - AG_{threshold}(j)) \ge Z$$

In Equation 13, $I(x)=1$ if $x \le 0$, $I(x)=0$ if $x>0$, and Z represents an arbitrary integer. In the case of generating PMI_report(k) according to Equation 12 and Equation 13, the number of PMI_report(k) is not greater than L, the number of iPMIj. According to Equation 13, when the antenna gain of the PMI belonged to PMI_subset(j) is greater than a predetermined threshold value $AG_{threshold}(j)$ and the sum of the number of such PMIs exceeds Z, iPMIj may be determined to be PMI_report(k).

The threshold value used in Equation 10 and Equation 11 may be applied to $I(AG(PMI_i)-AG_{threshold}(j))$ of Equation 13. That is, $I(AG(PMI_i)-AG_{threshold}(j))$ may be replaced by $I(PAG(PMI_i)-PAG_{threshold}(j))$, $I(PAG(PMI_i)-AG_{threshold}(i))$, $I(P \times N \times AG(PMI_i)-EAG_{threshold}(j))$ or $I(P \times N \times AG(PMI_i)-EAG_{threshold}(i))$.

According to another embodiment of the present invention, PMI_report(k) is generated using PMI_subset(j) as represented in Equation 12, but PMI_report(k) may be determined based on the summation of the interference energies transmitted in iPMIj region. This is represented as Equation 14 below.

$$PMI\_report(k) = \\ iPMI_j \text{ if } \sum_{i \in PMI\_subset(j)} AG(PMI_i) \geq EAG_{threshold}(j)$$ [Equation 14]

Figure 10:
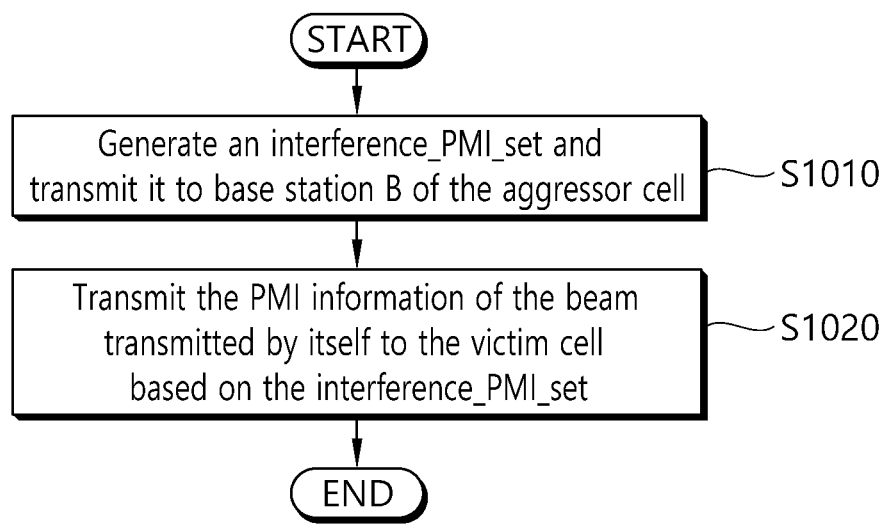
FIG. 10 is a diagram for describing a signal transmission method according to an embodiment of the present invention.

FIG. 10 is a diagram for describing a signal transmission method according to an embodiment of the present invention.

A method for transmitting and receiving inter-cell interference information according to the embodiment will be described below with reference to FIG. 10.

First, it is assumed that base station A and base station B manage a victim cell and an aggressor cell that are adjacent.

Base station A of the victim cell may generate an interference PMI_set and transmit it to base station B of the aggressor cell (step, S1010).

The interference_PMI_set may include PMIs of a specific region, for example, a region which is divided into a horizontal or vertical direction. The PMI may indicate a directional point of a horizontal or vertical direction of a beam. In the case of introducing such an interference_PMI_set, an amount of the information to be sent when controlling an inter-cell interference control is decreased, and the time required for forwarding an interference control signal is decreased, thereby it is efficient in the case of being sensitive to a delay time.

In addition, base station A of the victim cell determines an interference_PMI_set and transmits it to base station B of the aggressor cell, and thus, the victim cell may be the subject of determining a range or an amount of performing interference removal.

In addition, even in the case that it is unable to anticipate interference due to the coverage mismatch between the CSI-RS of an interference signal and a beamforming signal owing to the introduction of the massive MIMO system, the interference may be anticipated utilizing the interference_PMI_set for a beam. And the case that interference does not occur in the victim cell cell due to the shadowing may be excluded from the interference information.

Base station B of the aggressor cell that receives the interference_PMI_set may transmit the PMI information of the beam transmitted by itself to the victim cell based on the interference_PMI_set (step, S1020).

The PMI information transmitted in the aggressor cell may be the index information for at least one PMI that constructs the interference_PMI_set, and may be determined as the PMI information in the case that an antenna gain of a signal or the value of antenna gain multiplied by power or energy exceeds a threshold value.

In addition, in the case that there is a plurality of PMIs that correspond to a specific quantization region, only the PMI information less than a predetermined number that may represent the corresponding quantization region, not individual PMI information, may be transmitted to base station B of the victim cell.

Figure 11:
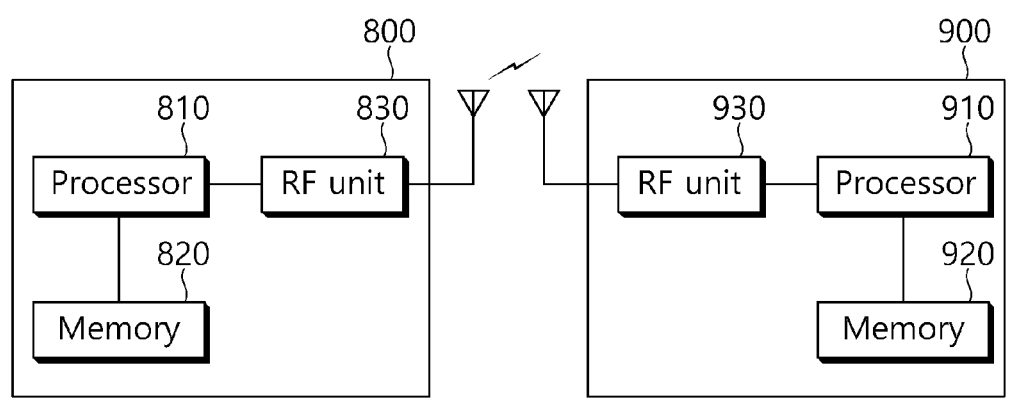
FIG. 11 is a block diagram of a wireless communication system according to an embodiment of the present invention.

FIG. 11 is a block diagram of a wireless communication system according to an embodiment of the present invention.

The base station 800 includes a processor 810, a memory 820, and an RF (radio frequency) unit 830. The processor 810 implements functions, processes, and/or methods as suggested herein. The layers of a wireless interface protocol may be implemented by the processor 810. The memory 820 is connected with the processor 810 and stores various pieces of information for driving the processor 810. The RF unit 830 is connected with the processor 810 and transmits and/or receives radio signals.

The user equipment 900 includes a processor 910, a memory 920, and an RF unit 930. The processor 910 implements functions, processes, and/or methods as suggested herein. The layers of a wireless interface protocol may be implemented by the processor 910. The memory 920 is connected with the processor 910 and stores various pieces of information for driving the processor 910. The RF unit 930 is connected with the processor 910 and transmits and/or receives radio signals.

The processor may include an application-specific integrated circuit (ASIC), a separate chipset, a logic circuit, and/or a data processing unit. The memory may include a read-only memory (ROM), a random access memory (RAM), a flash memory, a memory card, storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

As described above, an aspect of the present invention proposes a method for exchanging information utilizing a predefined interference_PMI_set in order to remove inter-cell interference in a communication system in which high beam gain is existed.

In the above-described systems, the methods are described with the flowcharts having a series of steps or blocks, but the present invention is not limited to the steps or order. Some steps may be performed simultaneously or in a different order from other steps. It will be understood by one of ordinary skill that the steps in the flowcharts do not exclude each other, and other steps may be included in the flowcharts or some of the steps in the flowcharts may be deleted without affecting the scope of the invention.

What is claimed is:

1. A method for transmitting and receiving, by a base station of a serving cell, inter-cell information for removing inter-cell interference, the method comprising:
   transmitting, to a base station of a neighboring cell, a Precoding Matrix Indicator (PMI) set that is a set of PMIs of a signal that causes interference in an area divided into a predetermined direction,
   wherein the signal that causes the interference is transmitted from the base station of the neighboring cell; and
   receiving, from the base station of the neighboring cell, PMI information for at least one of the PMIs included in the PMI set,
   wherein the at least one of the PMIs is determined in the PMI set when a product of a first transmission power and a first antenna gain is greater than or equal to a predetermined threshold value, wherein the first transmission power and the first antenna gain are used for transmitting the at least one of the PMIs, wherein the predetermined threshold value is a value of a product of a second transmission power and a second antenna gain, wherein the second transmission power is detected as interference by a user equipment of the serving cell, and wherein the second antenna gain is an antenna gain of the at least one of the PMIs received by the user equipment of the serving cell.

2. The method of claim 1, wherein the area is a space, in which a signal transmitted from the base station of the neighboring cell is available to be received, divided into a horizontal direction or a vertical direction.

3. The method of claim 1, wherein the PMI set includes PMIs corresponding to the area.

4. The method of claim 3, wherein the PMI information is a PMI corresponding to the area that includes a directional point of the signal transmitted from the base station of the neighboring cell.

5. The method of claim 4, when a plurality of signals is transmitted from the base station of the neighboring cell, corresponding to an area,
wherein a plurality of the PMI information is received.

6. The method of claim 4, when a plurality of signals is transmitted from the base station of the neighboring cell, corresponding to an area,
wherein the PMI information is determined based on a summation of the PMIs of the plurality of signals.

7. The method of claim 1, wherein the predetermined threshold value is different for each PMI that constructs the PMI set.

8. A base station of a serving cell for transmitting and receiving inter-cell information for removing inter-cell interference, the base station of the serving cell comprising:
a signal transceiver; and
a processor connected with the signal transceiver,
wherein the processor is configured to:
control the signal transceiver to transmit, to a base station of a neighboring cell, a Precoding Matrix Indicator (PMI) set that is a set of PMIs of a signal that causes interference in an area divided into a predetermined direction,
wherein the signal that causes the interference is transmitted from the base station of the neighboring cell, and
control the signal transceiver to receive, from the base station of the neighboring cell, PMI information for at least one of the PMIs included in the PMI set,
wherein the at least one of the PMIs is determined in the PMI set when a product of a first transmission power and a first antenna gain is greater than or equal to a predetermined threshold value,
wherein the first transmission power and the first antenna gain are used for transmitting the at least one of the PMIs,
wherein the predetermined threshold value is a value of a product of a second transmission power and a second antenna gain,
wherein the second transmission power is detected as interference by a user equipment of the serving cell, and
wherein the second antenna gain is an antenna gain of the at least one of the PMIs received by the user equipment of the serving cell.

9. The base station of the serving cell of claim 8, wherein the area is a space, in which a signal transmitted from the base station of the neighboring cell is available to be received, divided into a horizontal direction or a vertical direction, and
wherein the PMI set includes PMIs corresponding to the area.

10. The base station of the serving cell of claim 8, wherein the PMI information is a PMI corresponding to the area that includes a directional point of the signal transmitted from the base station of the neighboring cell.

* * * * *